(12) United States Patent
DeCusatis et al.

(10) Patent No.: US 7,505,409 B2
(45) Date of Patent: Mar. 17, 2009

(54) DATA MAPPING DEVICE, METHOD, AND ARTICLE OF MANUFACTURE FOR ADJUSTING A TRANSMISSION RATE OF ISC WORDS

(75) Inventors: Casimer Maurice DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 11/046,283

(22) Filed: Jan. 28, 2005

(65) Prior Publication Data
US 2006/0171317 A1    Aug. 3, 2006

(51) Int. Cl.
*H04J 3/06*    (2006.01)
(52) U.S. Cl. ..................... 370/235; 709/234
(58) Field of Classification Search ................. 370/235; 709/234
See application file for complete search history.

(56) References Cited

U.S. PATENT DOCUMENTS

| | | | | |
|---|---|---|---|---|
| 5,610,945 | A * | 3/1997 | Gregg et al. | 375/260 |
| 6,545,691 | B1 | 4/2003 | Vallejo | 345/804 |
| 6,560,607 | B1 | 5/2003 | Lassesen | 707/101 |
| 6,816,509 | B2 | 11/2004 | Pelley et al. | 370/466 |
| 2002/0090007 | A1 | 7/2002 | Kamiya et al. | 370/476 |
| 2003/0061375 | A1 | 3/2003 | Gregg et al. | 709/237 |
| 2003/0115045 | A1 * | 6/2003 | Harris et al. | 704/214 |
| 2004/0085904 | A1 * | 5/2004 | Bordogna et al. | 370/236 |
| 2004/0100958 | A1 | 5/2004 | Peng | 370/392 |
| 2007/0058652 | A1 * | 3/2007 | Hahn et al. | 370/412 |

* cited by examiner

*Primary Examiner*—Wing F Chan
*Assistant Examiner*—Matthew Campbell
(74) *Attorney, Agent, or Firm*—Cantor Colburn LLP; William Kinnaman, Jr.

(57) ABSTRACT

A data mapping device, a method, and an article of manufacture for adjusting a transmission rate of ISC words are provided. The GFP data mapping device has a FIFO buffer and a transceiver operably coupled to the FIFO buffer. The method includes reading first and second ISC words from the FIFO buffer that were received from a transmitting device. The method further includes determining whether a first number of ISC words stored in the FIFO buffer are greater than a second predetermined number indicating an over-running condition. The method further includes determining whether the first and second ISC words indicate either an ISC continuous sequence of words or an ISC idle sequence of words, if the first number is greater than the second predetermined number. The method further includes deleting the first and second ISC words if the first and second ISC words indicate either the ISC continuous sequence of words or the ISC idle sequence of words. The method further includes reading a third ISC word from the FIFO buffer and transmitting the third ISC word from the transceiver.

20 Claims, 9 Drawing Sheets

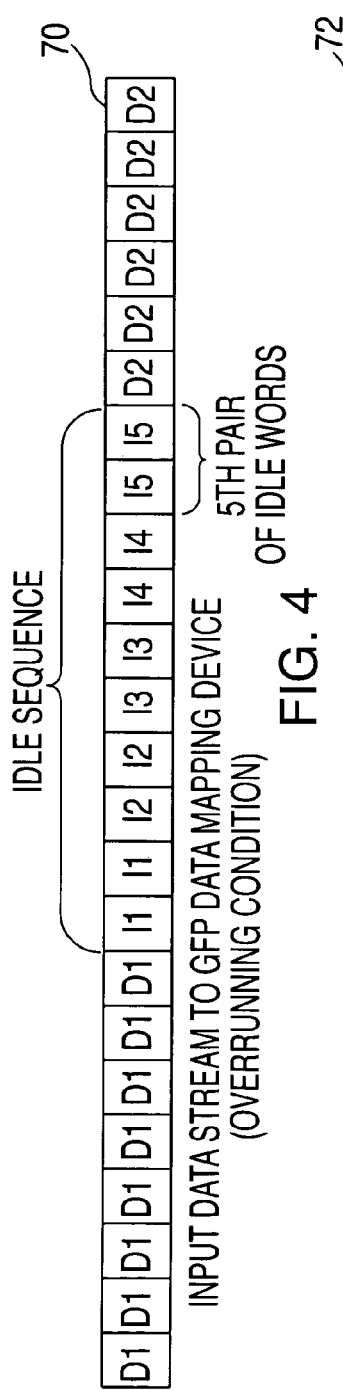
FIG. 4
FIG. 5
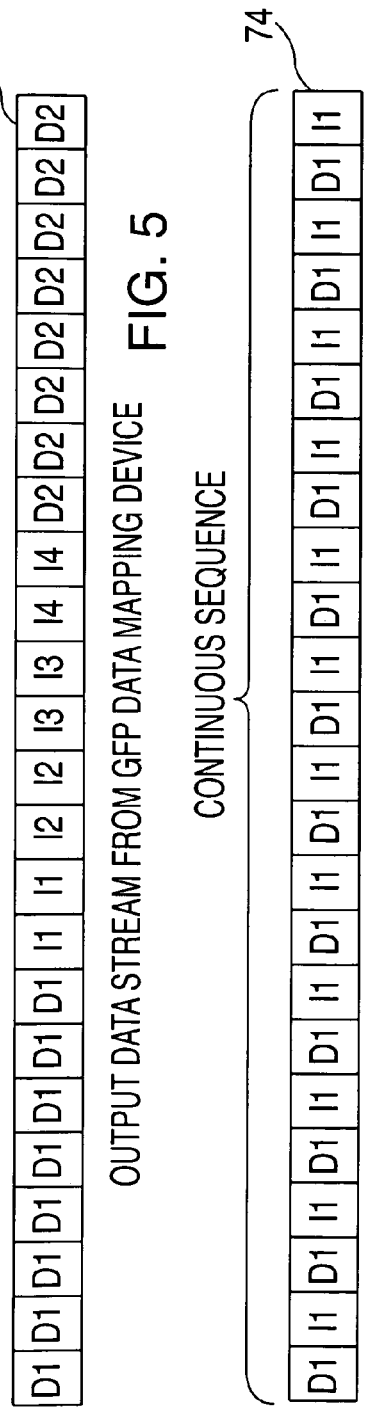
FIG. 6
FIG. 7

DATA MAPPING DEVICE, METHOD, AND ARTICLE OF MANUFACTURE FOR ADJUSTING A TRANSMISSION RATE OF ISC WORDS

FIELD OF INVENTION

This application relates to a data mapping device, a method, and an article of manufacture for adjusting a transmission rate of ISC words.

BACKGROUND OF INVENTION

International Business Systems (IBM) developed the Intersystem Channel (ISC) data format for transmitting data between computers. The inventors herein have recognized that is would be advantageous to encapsulate ISC words in Generic Framing Procedure (GFP) frames for transmitting the ISC words over a synchronous optical communication network (SONET). A problem associated with the transmitting ISC words from a first computer through the SONET communication network to a second computer is that repeating devices disposed between the first and second computers may have different clock speeds than the first computer. When a data mapping device for encapsulating the ISC words in a GFP frame has a different clock speed than the first computer, either an over-running condition or an under-running condition can occur.

An over-running condition occurs when a transmission rate of ISC words received from the first computer by the data mapping device is greater than a transmission rate of the ISC words from the data mapping device. If the over-running condition is not addressed, an internal storage buffer within the data mapping device can overflow and ISC words can be lost during transmission from the first computer to the second computer.

An under-running condition occurs when a transmission rate of the ISC words received from the first computer by the data mapping device is less than a transmission rate of the ISC words from the data mapping device. If the under-running condition is not addressed, an internal storage buffer within the data mapping device will not have sufficient ISC words to be transmitted through the SONET communication network.

Accordingly, there is a need for a data mapping device and a method for adjusting a transmission rate of ISC words therefrom to minimize or eliminate the under-running condition and the over-running condition.

SUMMARY OF INVENTION

A method for adjusting a transmission rate of ISC words from a GFP data mapping device in accordance with an exemplary embodiment is provided. The GFP data mapping device has a FIFO buffer and a transceiver operably coupled to the FIFO buffer. The method includes reading first and second ISC words from the FIFO buffer that were received from a transmitting device. The method further includes determining whether a first number of ISC words stored in the FIFO buffer are greater than a second predetermined number indicating an over-running condition. The method further includes determining whether the first and second ISC words indicate either an ISC continuous sequence of words or an ISC idle sequence of words, if the first number is greater than the second predetermined number. The method further includes deleting the first and second ISC words if the first and second ISC words indicate either the ISC continuous sequence of words or the ISC idle sequence of words. The method further includes reading a third ISC word from the FIFO buffer and transmitting the third ISC word from the transceiver.

A data mapping device for adjusting a transmission rate of ISC words in accordance with another exemplary embodiment is provided. The data mapping device includes a transceiver configured to receive ISC words and to transmit ISC words. The data mapping device further includes a FIFO buffer operably coupled to the transceiver configured to store ISC words received by the transceiver. The data mapping device further includes a processor operably coupled to the FIFO buffer. The processor is configured to read first and second ISC words from the FIFO buffer. The processor is further configured to determine whether a first number of ISC words stored in the FIFO buffer are greater than a second predetermined number indicating an over-running condition. The processor is further configured to determine whether the first and second ISC words indicate either an ISC continuous sequence of words or an ISC idle sequence of words, if the first number is greater than the second predetermined number. The processor is further configured to delete the first and second ISC words if the first and second ISC words indicate either the ISC continuous sequence of words or the ISC idle sequence of words. The processor is further configured to read a third ISC word from the FIFO buffer and to induce the transceiver to transmit the third ISC word.

An article of manufacture in accordance with another exemplary embodiment is provided. The article of manufacture includes a computer storage medium having a computer program encoded therein for adjusting a transmission rate of ISC words from a GFP data mapping device. The GFP data mapping device has a FIFO buffer and a transceiver operably coupled to the FIFO buffer. The computer storage medium includes code for reading first and second ISC words from the FIFO buffer that were received from a transmitting device. The computer storage medium further includes code for determining whether a first number of ISC words stored in the FIFO buffer are greater than a second predetermined number indicating an over-running condition. The computer storage medium further includes code for determining whether the first and second ISC words indicate either an ISC continuous sequence of words or an ISC idle sequence of words, if the first number is greater than the second predetermined number. The computer storage medium further includes code for deleting the first and second ISC words if the first and second ISC words indicate either the ISC continuous sequence of words or the ISC idle sequence of words. The computer storage medium further includes code for reading a third ISC word from the FIFO buffer and transmitting the third ISC word from the transceiver.

Other systems, methods and/or computer program products according to the embodiments will be or become apparent to one with skill in the art upon review of the following drawings and detailed description. It is intended that at all such additional systems, methods, and/or computer program products be within the scope of the present invention, and be protected by the accompanying claims.

BRIEF DESCRIPTION OF DRAWINGS

FIG. 4 is a first input stream of words that is received by the GFP data mapping device of FIG. 2;

FIG. 5 is a first output stream of words that is output by the GFP data mapping device in response to the first input stream of words of FIG. 4;

FIG. 6 is a second input stream of words that is received by the GFP data mapping device of FIG. 2;

FIG. 7 is a second output stream of words that is output by the GFP data mapping device in response to the second input stream of words of FIG. 6.

DESCRIPTION OF AN EMBODIMENT

Figure 1:
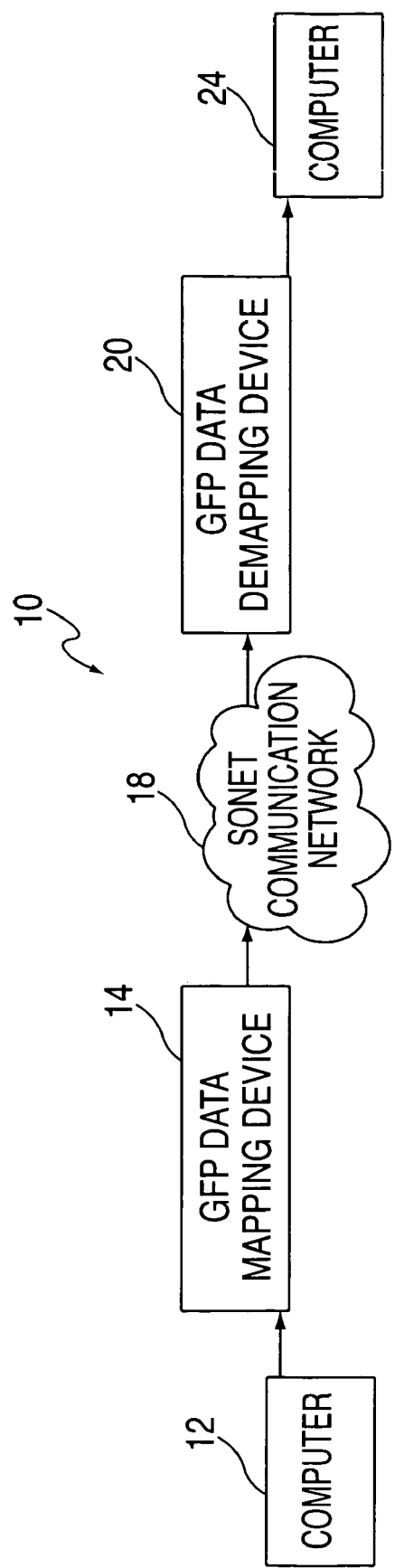
FIG. 1 is a block diagram of a system having a GFP data mapping device that adjusts a transmission rate of ISC words therefrom in accordance with an exemplary embodiment.

Referring to FIG. 1, a communication system 10 having a GFP data mapping device 14 for adjusting a transmission rate of ISC words is illustrated. The system 10 includes a computer 12, a GFP data mapping device 14, a synchronous optical communication network 18, a GFP data demapping device 20, and a computer 24.

For purposes of discussion, a brief explanation of some of the words used herein will now be explained. An ISC word comprises a 40-bit word representing four characters. Further, an ISC word can comprise either (i) a data word comprising four 10-bit data characters, or (ii) a special word comprising either an idle word or a null word. An "idle word" comprises a word that is generally transmitted when a computer is not transmitting data frames. An "idle sequence of words" comprises a plurality of adjacent idle words. A "null word" comprises a word that is neither a data word nor an idle word that can be added to a stream of words at any position therein without affecting the content of the stream of words. A "continuous sequence of words", also called a primitive sequence of words, is a plurality of pairs of idle words and data words, that is used instead of an idle sequence, and indicates an operational status of a computer. For example, a continuous sequence of words can comprise the following sequence of words: a first idle word, a first data word, a second idle word, a second data word, etc. Finally, a "data frame" comprises a plurality of data words and is transmitted between a first idle sequence of words and a second idle sequence of words.

The computer 12 is provided to transmit ISC words to the GFP data mapping device 14. Further, the computer 12 has a transmission clock (not shown) that controls the transmission rate of the ISC words therefrom. The computer 12 is operably coupled to the GFP data mapping device 14 and to the GFP data demapping device 16.

Figure 2:
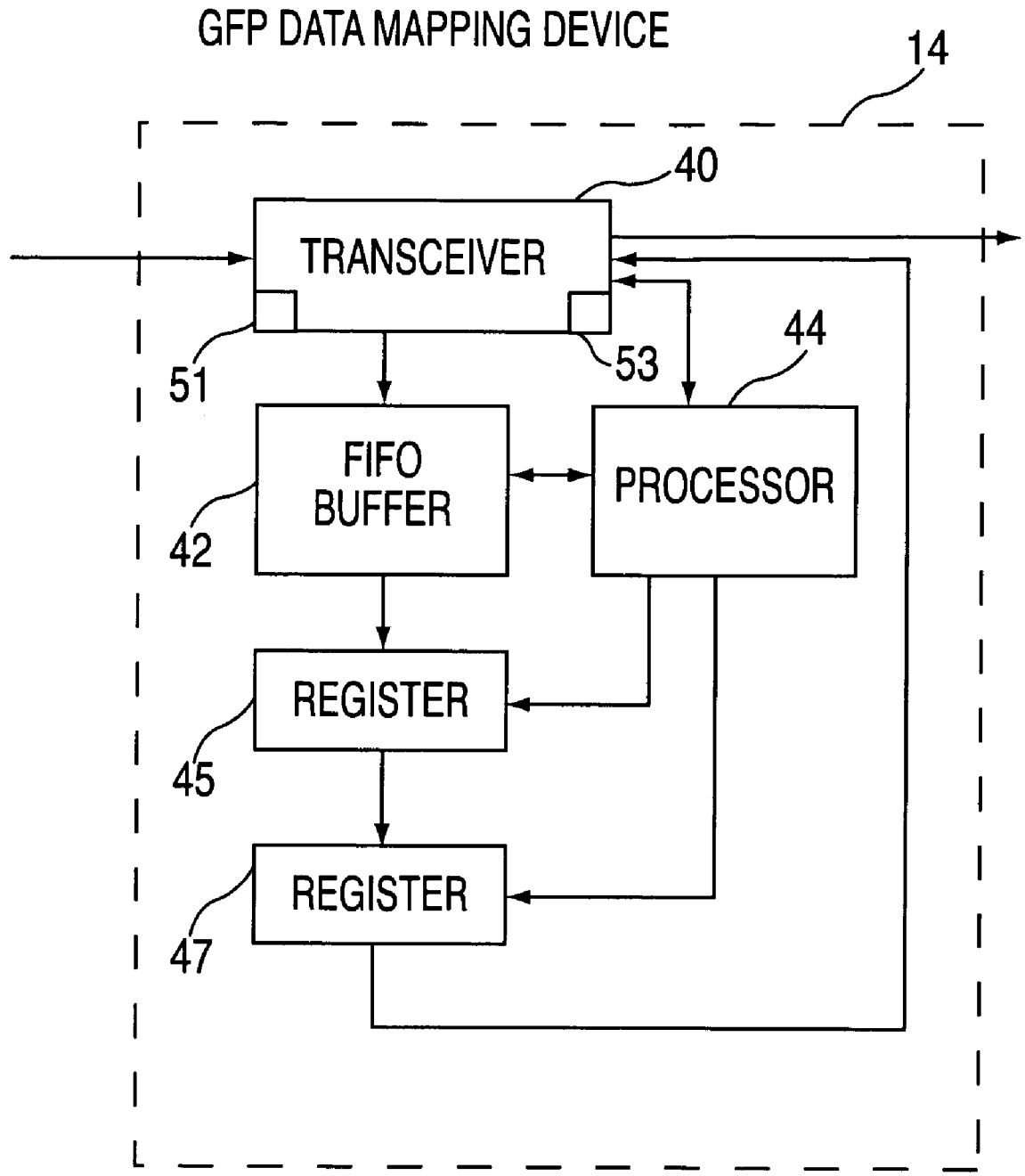
FIG. 2 is a block diagram of the GFP data mapping device utilized in the system of FIG. 1.
Figure 3:
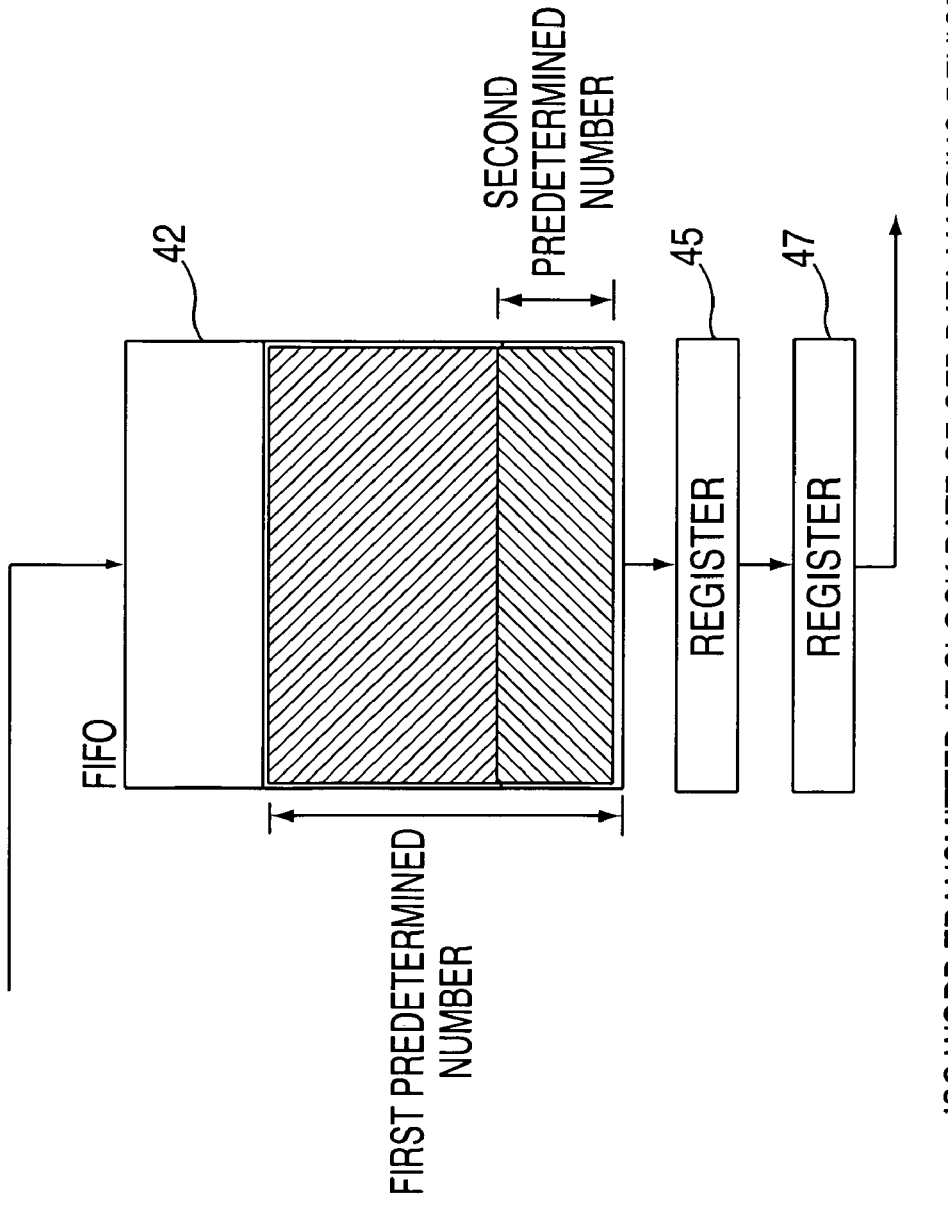
FIG. 3 is a block diagram of a FIFO buffer utilized in the GFP data mapping device of FIG. 2.
Figure 8:
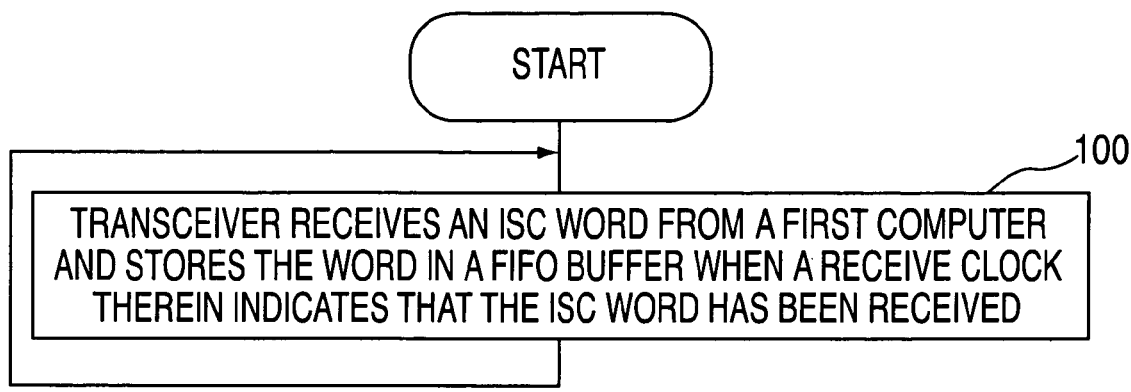
FIGS. 8-12 are flowcharts of a method for adjusting a transmission rate of ISC words from a GFP data mapping device.
Figure 9:
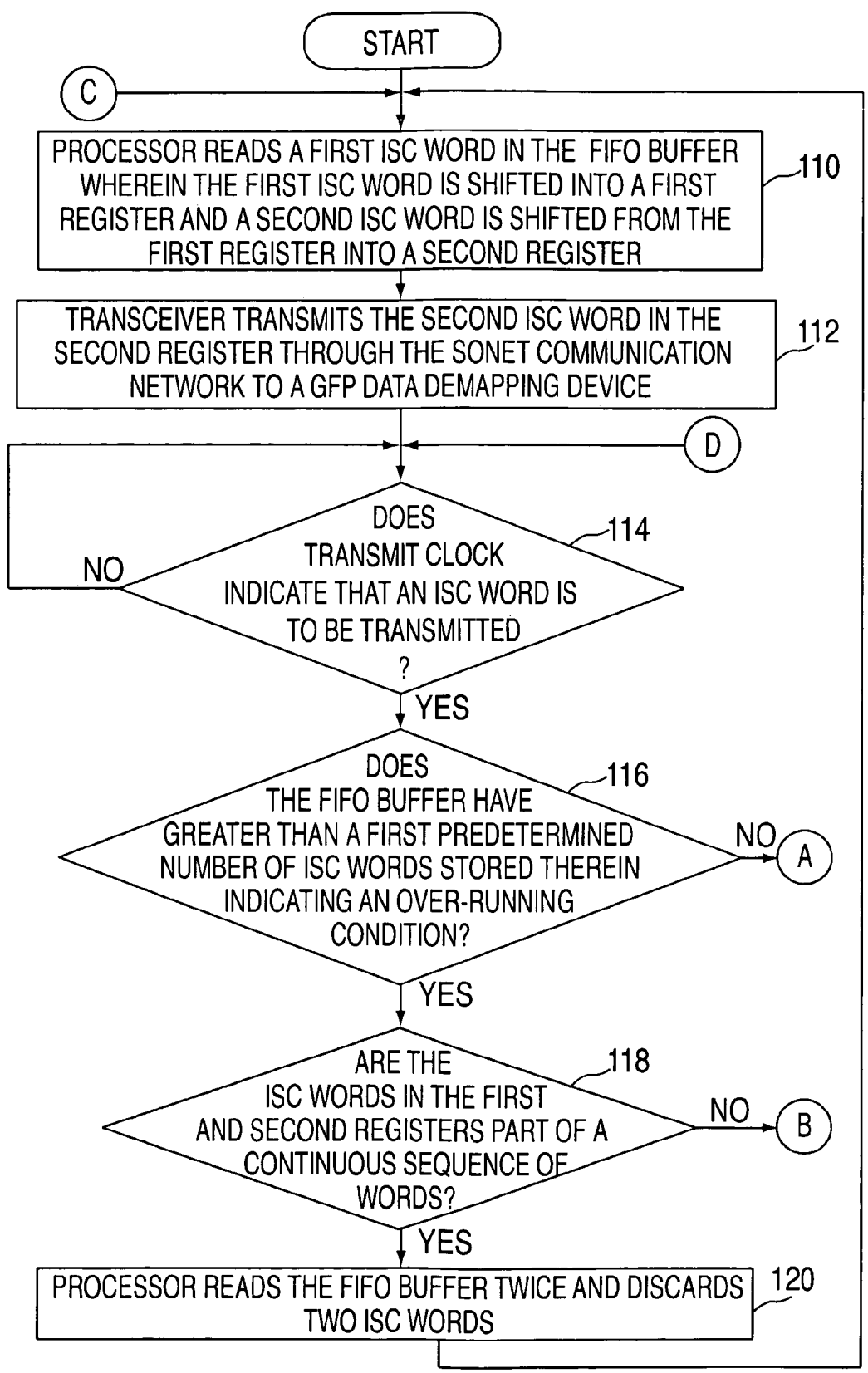
Figure 10:
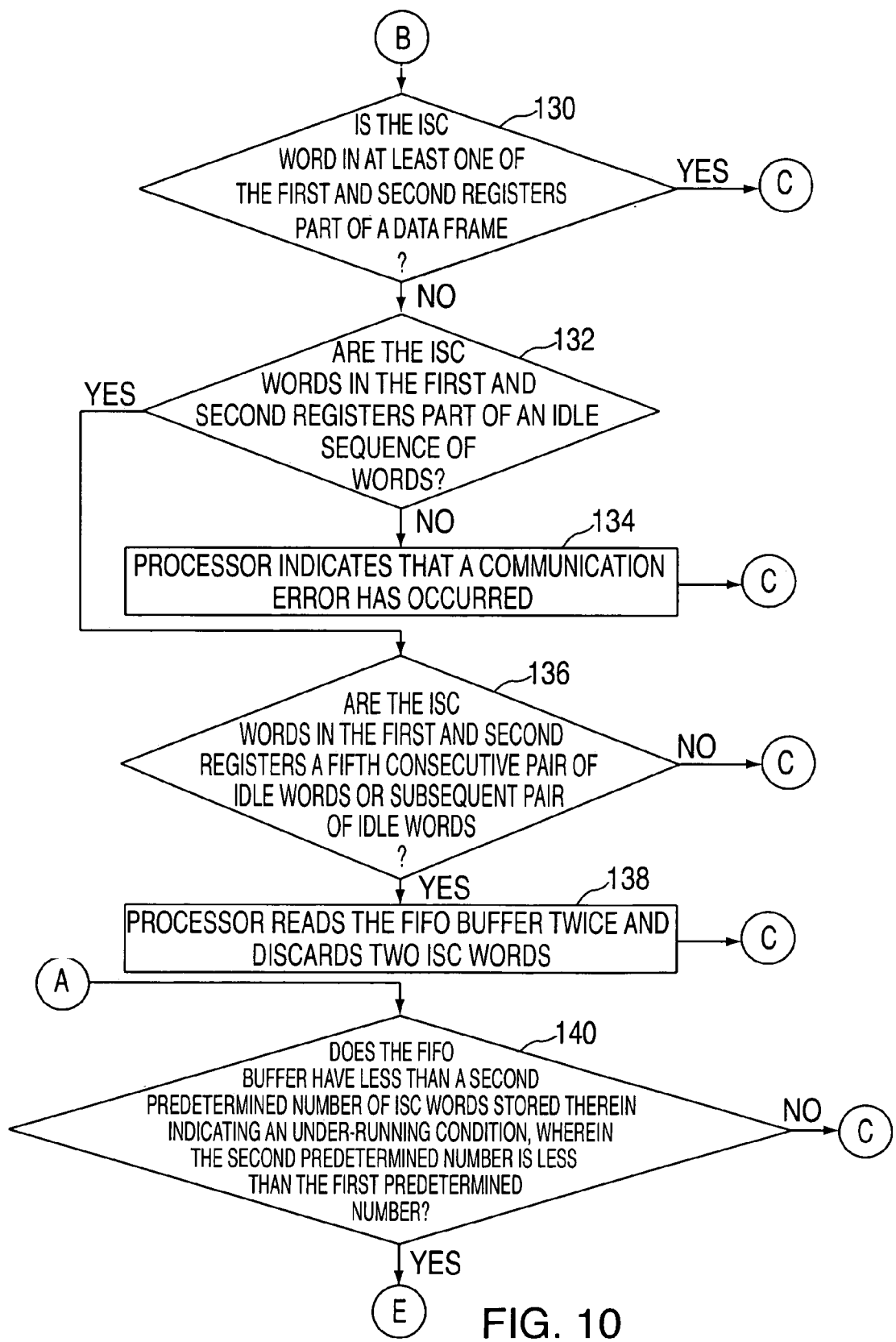

Referring to FIGS. 1-3, the GFP data mapping device 14 is provided to receive the ISC words from the computer 12 and to adjust a transmission rate of the ISC words from the device 14. In particular, when the GFP data mapping device 14 detects an over-running condition (i.e., when a transmission rate of ISC words received from the computer 12 by the device 14 is greater than a transmission rate of the ISC words from the device 14) the device 14 can remove received ISC words from a received data stream to obtain a desired transmission rate from the device 14. The device 14 determines that an over-running condition has occurred when a number of ISC words stored therein is greater than a first predetermined value. When the device 14 detects an under-running condition (i.e., when a transmission rate of the ISC words received from the computer 12 by the device 14 is less than a transmission rate of the ISC words from the device 14), the device 14 can add pairs of words to the data stream to obtain a desired transmission rate therefrom. The device 14 determines that an under-running condition has occurred when a number of ISC words stored therein is less than or equal to a second predetermined value that is less than the first predetermined value.

As shown, the GFP data mapping device 14 includes a transceiver 40, a first-in first-out (FIFO) buffer 42, a processor 44, and registers 45, 47. The transceiver 40 operably communicates with the computer 12 for receiving ISC words therefrom. Further, the transceiver 40 operably communicates with the SONET communication network 18 for transmitting ISC words therethrough. The transceiver 40 includes a receive clock 51 and a transmit clock 53. The receive clock 51 indicates when an ISC word has been received by the transceiver 40 from the computer 12. The receive clock 51 has a phase-lock loop architecture known by those skilled in the art. The transmit clock 53 indicates when an ISC word, read from the FIFO buffer 42, is to be transmitted from the transceiver 40 through the SONET communication network 18. When the FIFO buffer 42 is read, an ISC word in the register 45 is shifted to the register 47 and another ISC word in the FIFO buffer 42 is shifted into the register 45. The processor 44 can induce the transceiver 42 to transmit an ISC word from the register 47, after a read of the FIFO buffer 42 has occurred. Alternately, the processor 44 can delete an ISC word from the register 47, if desired.

The SONET communication network 18 is provided to transmit GFP frames encapsulating ISC words to the GFP data demapping device 20. The SONET communication network 18 is operably coupled between the GFP data mapping device 14 and the GFP data demapping device 20.

Referring to FIGS. 1 and 3, the GFP data demapping device 20 is provided to decode the GFP frames to obtain the ISC words encapsulated therein. The device 20 is further configured to transmit the ISC words to the computer 24.

For purposes of understanding, a brief description of how the GFP data mapping device 20 adjusts a transmission rate of ISC words during both an over-running condition and an under-running condition will now be explained. Referring to FIGS. 4 and 5, an input data stream 70 is received by the GFP data mapping device 14. The input data stream 70 includes a plurality of data words (D1) followed by an idle sequence of words (e.g., I1, I1, I2, I2, I3, I3, I4, I4, I5, I5). When the device 14 detects an over-running condition, the device 14 removes the fifth pair of idle words (e.g., I5, I5) from the input data stream 70 and outputs the remaining ISC words as shown by the output data stream 72. Thus, by removing the idle word pair, the transmission rate of the device 20 is reduced and no data words are lost in the FIFO buffer 42.

Referring to FIGS. 6 and 7, an input data stream 74 is received by the GFP data mapping device 14. The input data stream 74 comprises a continuous sequence of words including a plurality of data words (D1) and idle words (I1). When the device 14 detects an under-running condition, the device 14 adds a data word and an idle word (e.g., DX, IX) to the input data stream 74 and outputs the data stream 76. The word DX has an identical value as the word D1 in the output data stream 76. Further, the word IX has an identical value as the word I1 in the output data stream 76.

When the GFP data mapping device 20 adjusts a transmission rate of ISC words during both an over-running condition and an under-running condition, the device 20 utilizes the following five rules: (i) data frames are not alternated, except that null words can be inserted in the data frames, (ii) at least four idle word pairs must be present between data frames, (iii) a pair of ISC words in a continuous sequence of words can be removed at any time, (iv) a pair of ISC words can be inserted within a continuous sequence of words wherein one of the inserted ISC words comprises a data word identical to other data words in the continuous sequence of words, (v) a pair of idle words can be inserted anywhere in an idle sequence of words.

Referring to FIGS. 8-11, a method for adjusting a transmission rate of ISC words from the GFP data mapping device 14 will now be explained. The method includes a step 100 that is performed asynchronously with respect to the remaining steps. At step 100, the transceiver 40 receives an ISC word from the computer 12 and stores the word in the FIFO buffer 42 when a receive clock 51 indicates that the ISC word has been received.

At step 110, the processor 44 reads a first ISC word in the FIFO buffer 42 wherein the first ISC word is shifted into register 45 and a second ISC word is shifted from the register 45 into a register 47.

At step 112, the transceiver 40 transmits the second ISC word in the register 47 through the SONET communication network 18 to the GFP data demapping device 20.

At step 114, the processor 44 makes a determination as to whether the transmit clock 53 indicates that an ISC word is to be transmitted. If they value of step 114 equals "yes", the method advances to step 116. Otherwise, the method advances to step 114.

At step 116, the processor 44 makes a determination as to whether the FIFO buffer 42 has greater than a first predetermined number of ISC words stored therein, indicating an over-running condition. If the value of step 116 equals "yes", the method advances to step 118. Otherwise, the method advances to step 140.

At step 118, the processor 44 makes a determination as to whether the ISC words in the registers 45, 47 are part of a continuous sequence of words. If the value of step 118 equals "yes", the method advances to 120. Otherwise, the method advances to step 130.

At step 120, the processor 44 reads the FIFO buffer 42 twice and discards two ISC words. After step 120, the method of advances to step 110.

Referring again to step 118, if the value of step 118 equals "no", the method advances to step 130. At step 130, but processor 44 makes a determination as to whether an ISC word in at least one of the registers 45, 47 is part of a data frame. If the value of step 130 equals "yes", the method advances to step 110. Otherwise, the method advances to step 132.

At step 132, the processor 44 makes a determination as to whether the ISC words in the registers 45, 47 are part of an idle sequence of words. If the value of step 132 equals "yes", the method advances to step 136. Otherwise, the method advances to step 134.

At step 134, the processor 44 indicates that a communication error has occurred. After step 134, the method advances to step 110.

At step 136, the processor 44 makes a determination as to whether the ISC words in the registers 45, 47 are a fifth consecutive pair of idle words or a subsequent pair of idle words after the fifth consecutive pair of idle words. If the value of step 136 equals "yes", the method advances to step 138. Otherwise, the method advances to step 110.

At step 138, the processor 44 reads the FIFO buffer 42 twice and discards two ISC words. After step 138, the method advances to step 110.

Referring again to step 116, if the value of step 116 equals "no", the method advances to step 140. At step 140, the processor 44 makes a determination as to whether the FIFO buffer 42 has less than a second predetermined number of ISC words stored therein, indicating an under-running condition, wherein the second predetermined number is less than the first predetermined number. If the value of step 140 equals "yes", the method advances to step 146. Otherwise, the method advances to step 110.

At step 146, the processor 44 makes a determination as to whether the ISC words in the registers 45, 47 are part of a continuous sequence of words. If the value of step 146 equals "yes", the method advances to step 148. Otherwise, the method advances to step 150.

At step 148, the transceiver 40 transmits an idle word and a data word, associated with the continuous sequence of words through the SONET communication network 18 to the GFP data demapping device 20. After the step 148, the method advances to the step 114.

At step 150, the processor 44 makes a determination as to whether an ISC word in at least one of the registers 45, 47 is part of a data frame. If the value of step 150 equals "yes", the method advances to step 110. Otherwise, the method advances to step 152.

At step 152, the processor 44 makes a determination as to whether the ISC words in the registers 45, 47 are part of an idle sequence of words. If the value of step 152 equals "yes", the method advances to step 156. Otherwise, the method advances to step 154.

At step 154, the processor 44 indicates that a communication error has occurred. After step 154, the method advances to step 110.

At step 156, the transceiver 40 transmits a pair of idle words associated with an idle sequence of words through the SONET communication network 18 to the GFP data demapping device 20. After step 156, the method advances to the step 114.

Figure 11:
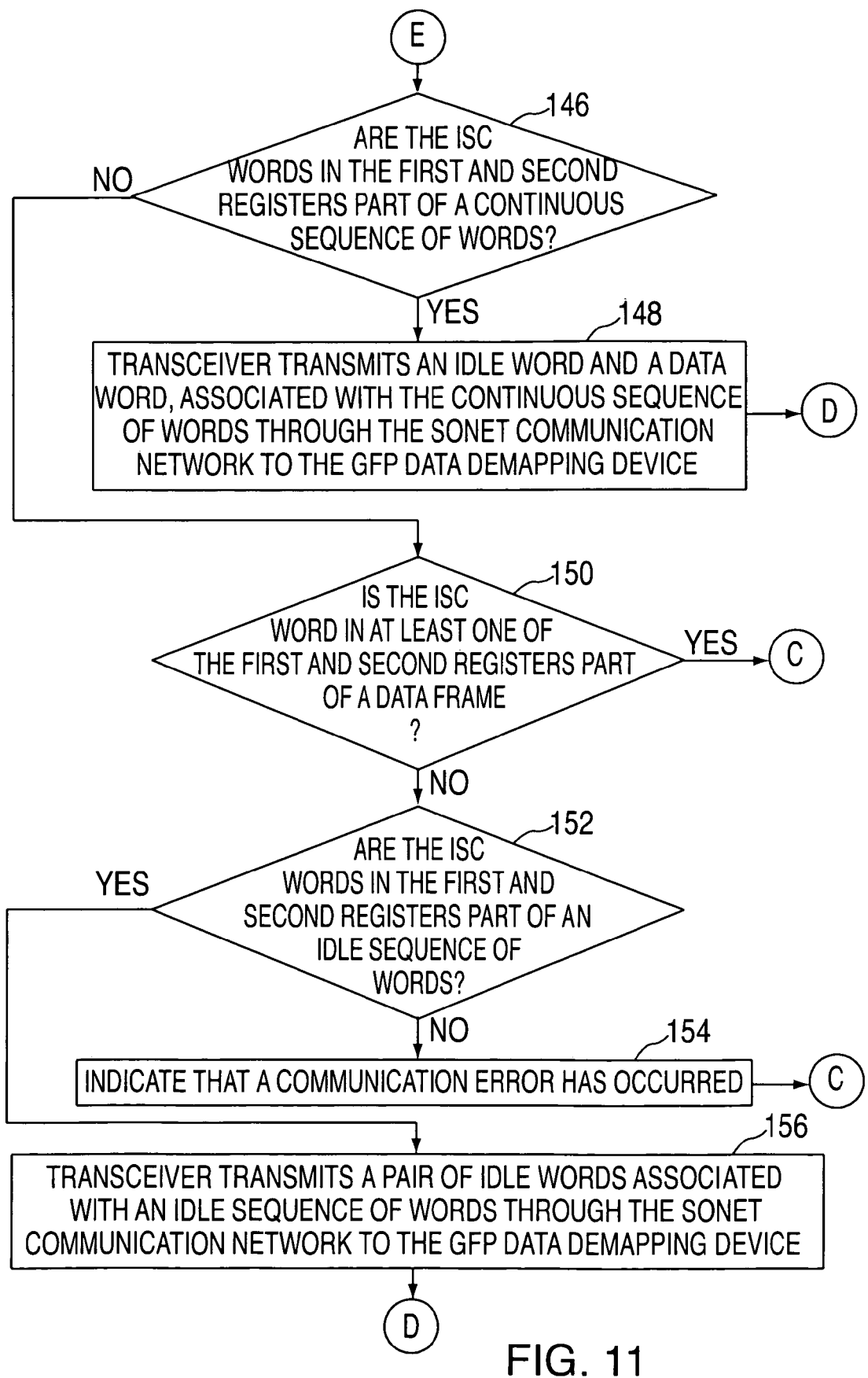
Figure 12:
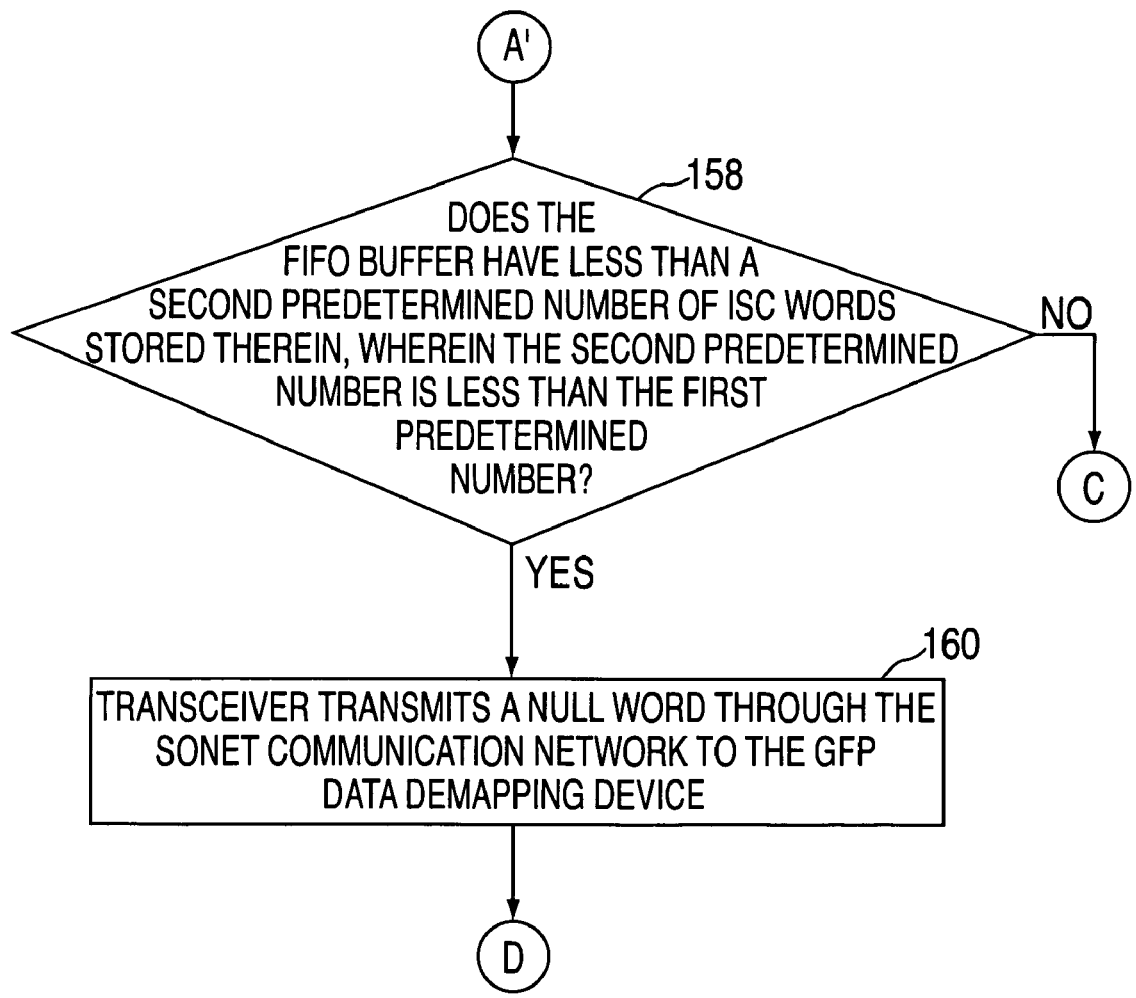

Referring to FIG. 11, the steps 158 and 160 that can be utilized in an alternate embodiment will be explained. In particular, the steps 158 and 160 can be utilized to replace the steps 140-156 discussed above, when an under-running condition is detected by the GPS data mapping device 14.

At step 158, the processor 44 makes a determination as to whether the FIFO buffer 42 has less than a second predetermined number of ISC words stored therein, wherein the second predetermined number is less than the first predetermined number. If the value of step 158 equals "yes", the method advances to step 160. Otherwise, the method advances to step 110.

At step 160, the transceiver 40 transmits a null word through the SONET communication network 18 to the GFP data demapping device 20. After step 160, the method advances to step 114.

The data mapping device and the method for adjusting a transmission rate of ISC words provide a substantial advantage over other devices and methods. In particular, the data mapping device and the method provide a technical effect of adjusting a transmission rate of ISC words to minimize or eliminate the under-running condition and the over-running condition in the GFP data mapping device.

While the invention is described with reference to an exemplary embodiment, it will be understood by those skilled in the art that various changes may be made an equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first,

We claim:

1. A method for adjusting a transmission rate of Intersystem Channel (ISC) words from a Generic Framing Procedure (GFP) data mapping device having a FIFO buffer and a transceiver operably coupled to the FIFO buffer, comprising:
   reading first and second ISC words from the FIFO buffer that were received from a transmitting device;
   determining whether a first number of ISC words stored in the FIFO buffer is greater than a second predetermined number indicating an over-running condition;
   determining whether the first and second ISC words indicate either an ISC continuous sequence of words or an ISC idle sequence of words only if the first number of ISC words is greater than the second predetermined number;
   deleting the first and second ISC words only if the first and second ISC words indicate either the ISC continuous sequence of words or the ISC idle sequence of words, and the first number of ISC words is greater than the second predetermined number indicating the over-running condition; and
   reading a third ISC word from the FIFO buffer and transmitting the third ISC word from the transceiver.

2. The method of claim 1, wherein the step of deleting the first and second ISC words comprises deleting the first and second ISC words if the first and second ISC words comprise a fifth consecutive pair of ISC idle words or a pair of ISC idle words after the fifth consecutive pair of ISC idle words.

3. The method of claim 1, further comprising:
   determining whether the first number of ISC words stored in the FIFO buffer is less than a third predetermined number indicating an under-running condition;
   determining whether the first and second ISC words indicate an ISC continuous sequence of words, if the first number is less than the third predetermined number; and
   transmitting an ISC idle word and an ISC data word from the transceiver if the first and second ISC words indicate the ISC continuous sequence of words.

4. The method of claim 3, wherein the ISC data word has an identical bit value as the first ISC word.

5. The method of claim 1, further comprising:
   determining whether the first number of ISC words stored in the FIFO buffer is less than a third predetermined number indicating an under-running condition;
   determining whether the first and second ISC words indicate an ISC idle sequence of words, if the first number is less than the third predetermined number; and
   transmitting third and fourth ISC idle words from the transceiver if the first and second ISC words indicate the ISC idle sequence of words.

6. The method of claim 1, further comprising:
   determining whether the first number of ISC words stored in the FIFO buffer is less than a third predetermined number indicating an under-running condition; and
   transmitting a third ISC null word from the transceiver.

7. The method of claim 1, wherein the step of reading the third ISC word from the FIFO buffer and transmitting the third ISC word from the transceiver comprises transmitting the third ISC word from the transceiver through a SONET communication network.

8. A Generic Framing Procedure (GFP) data mapping device for adjusting a transmission rate of ISC words, comprising:
   a transceiver configured to receive ISC words and to transmit ISC words; a FIFO buffer operably coupled to the transceiver configured to store ISC words received by the transceiver; and
   a processor operably coupled to the FIFO buffer, the processor configured to read first and second ISC words from the FIFO buffer;
   the processor further configured to determine whether a first number of ISC words stored in the FIFO buffer is greater than a second predetermined number indicating an over-running condition;
   the processor further configured to determine whether the first and second ISC words indicate either an ISC continuous sequence of words or an ISC idle sequence of words only if the first number of ISC words is greater than the second predetermined number;
   the processor further configured to delete the first and second ISC words only if the first and second ISC words indicate either the ISC continuous sequence of words or the ISC idle sequence of words, and the first number of ISC words is greater than the second predetermined number indicating the over-running; and
   the processor further configured to read a third ISC word from the FIFO buffer and to induce the transceiver to transmit the third ISC word.

9. The data mapping device of claim 8, wherein the processor is further configured to delete the first and second ISC words if the first and second ISC words comprise a fifth consecutive pair of ISC idle words or a pair of ISC idle words after the fifth consecutive pair of ISC idle words.

10. The data mapping device of claim 8, wherein the processor is further configured to determine whether the first number of ISC words stored in the FIFO buffer is less than a third predetermined number indicating an under-running condition, the processor further configured to determine whether the first and second ISC words indicate an ISC continuous sequence of words, if the first number is less than the third predetermined number, the processor further configured to induce the transceiver to transmit an ISC idle word and an ISC data word if the first and second ISC words indicate the ISC continuous sequence of words.

11. The data mapping device of claim 10, wherein the ISC data word has an identical bit value as the first ISC word.

12. The data mapping device of claim 8, wherein the processor is farther configured to determine whether the first number of ISC words stored in the FIFO buffer is less than a third predetermined number indicating an under-running condition, the processor further configured to determine whether the first and second ISC words indicate an ISC idle sequence of words, if the first number is less than the third predetermined number, the processor further configured to induce the transceiver to transmit third and fourth ISC idle words if the first and second ISC words indicate the ISC idle sequence of words.

13. The data mapping device of claim 8, wherein the processor is farther configured to determine whether the first number of ISC words stored in the FIFO buffer is less than a third predetermined number indicating an under-running condition, the processor further configured to induce the transceiver to transmit a third ISC null word.

14. The data mapping device of claim 8, wherein the transceiver is configured to transmit the third ISC word through a SONET communication network.

15. An article of manufacture, comprising:
   a computer storage medium having a computer program encoded therein for adjusting a transmission rate of ISC words from a GFP data mapping device, the GFP data mapping device having a FIFO buffer and a transceiver operably coupled to the FIFO buffer, the computer storage medium comprising:

code for reading first and second ISC words from the FIFO buffer that were received from a transmitting device;

code for determining whether a first number of ISC words stored in the FIFO buffer is greater than a second predetermined number indicating an over-running condition;

code for determining whether the first and second ISC words indicate either an ISC continuous sequence of words or an ISC idle sequence of words only if the first number is greater than the second predetermined number indicating the over-running condition;

code for deleting the first and second ISC words only if the first and second ISC words indicate either the ISC continuous sequence of words or the ISC idle sequence of words, and the first number of ISC words is greater than the second predetermined number indicating the over-running condition; and code for reading a third ISC word from the FIFO buffer and transmitting the third ISC word from the transceiver.

16. The article of manufacture of claim 15, wherein the computer storage medium further comprises:

code for determining whether the first number of ISC words stored in the FIFO buffer is less than a third predetermined number indicating an under-running condition;

code for determining whether the first and second ISC words indicate an ISC continuous sequence of words, if the first number is less than the third predetermined number; and code for inducing the transceiver to transmit an ISC idle word and an ISC data word if the first and second ISC words indicate the ISC continuous sequence of words.

17. The article of manufacture of claim 16, wherein the ISC data word has an identical bit value as the first ISC word.

18. The article of manufacture of claim 15, wherein the computer storage medium further comprises:

code for determining whether the first number of ISC words stored in the FIFO buffer is less than a third predetermined number indicating an under-running condition;

code for determining whether the first and second ISC words indicate an ISC idle sequence of words, if the first number is less than the third predetermined number; and code for transmitting third and fourth ISC idle words from the transceiver if the first and second ISC words indicate the ISC idle sequence of words.

19. The article of manufacture of claim 15, wherein the computer storage medium further comprises:

code for determining whether the first number of ISC words stored in the FIFO buffer is less than a third predetermined number indicating an under-running condition; and code for transmitting a third ISC null word from the transceiver.

20. The article of manufacture of claim 15, wherein the code for deleting the first and second ISC words comprises code for deleting the first and second ISC words if the first and second ISC words comprise a fifth consecutive pair of ISC idle words or a pair of ISC idle words after the fifth consecutive pair of ISC idle words.

\* \* \* \* \*